United States Patent [19]

Soca

[11] Patent Number: 4,712,132
[45] Date of Patent: Dec. 8, 1987

[54] DEVICE AND METHOD FOR REDUCING THE AMPLITUDE RANGE OF SIGNALS REPRESENTING AN IMAGE

[75] Inventor: Serge Soca, Ile Saint Louis, France

[73] Assignee: Thomson Video Equipment, Gennevilliers, France

[21] Appl. No.: 817,260

[22] Filed: Jan. 8, 1986

[30] Foreign Application Priority Data

Jan. 8, 1985 [FR] France ................................ 85 00182

[51] Int. Cl.$^4$ .............................................. H04N 9/68
[52] U.S. Cl. ..................................... 358/37; 358/166; 358/27
[58] Field of Search ............................. 358/37, 166, 27

[56] References Cited

U.S. PATENT DOCUMENTS 3,684,825  8/1972  Dischert .............................. 358/27
4,499,486  2/1985  Favreau ............................. 358/166
4,602,277  7/1986  Guichard ............................. 358/27

FOREIGN PATENT DOCUMENTS

0067083  12/1982  European Pat. Off. ............. 358/27

Primary Examiner—Michael A. Masinick
Attorney, Agent, or Firm—Cushman, Darby & Cushman

[57] ABSTRACT

An embodiment of the device comprises: three subtracters, three multipliers and a correction coefficient determination device. The subtracters and multipliers make it possible to obtain three signals, whose values are multiplied by a same coefficient, in order that they retain the same ratios as the values of the signals supplied to the input of the device. The device for determining a correction coefficient comprises means for determining which of the input signals has the highest instantaneous value at each time, in order to apply thereto a predetermined, non-linear transformation and for supplying a correction signal which is applied to the multipliers.

42 Claims, 11 Drawing Figures

DEVICE AND METHOD FOR REDUCING THE AMPLITUDE RANGE OF SIGNALS REPRESENTING AN IMAGE

BACKGROUND OF THE INVENTION

The invention relates to a device for reducing the amplitude range of three colour signals representing an image, the three signals being supplied by any source, such as a camera, a television film scanner, etc. These signals may have an amplitude range higher than that acceptable by presently used recording or transmission means. In order to restore a correct image, it is necessary to reduce the amplitude range of these signals prior to transmission or recording, so that their values never exceed a fixed maximum value. Since the very high amplitude values are statistically not very numerous, they are sacrificed to the benefit of medium and low values, making it possible to reconstitute the essential information in the image. However, in order not to loose all the information corresponding to the peaks of these high amplitude signals, the high amplitude are compressed rather than clipped.

In order to carry out a reduction in the dynamic range by compressing the highest values, it is known to use three identical, non-linear compression circuits, which respectively process the three colour signals. Their transfer function has a graph constituted by two straight line segments. The first segment, corresponding to the low and medium signal values, has a unitary slope, while the second segment, corresponding to the high signal values, has a slope which is below unity. It is possible to regulate the value at which the compression commences and the value of the slope of the second segment.

When the three colour signals represent achromatic image elements, the three colour signals have the same value. Therefore the signals restored by the compression circuits have the same value and the elements of the reconstituted image remain achromatic. However, colour signals corresponding to coloured elements do not have the same value and their value differences are reduced when one or more of the signal amplitudes is sufficiently high for a compression circuit to perform a compression. The values of the three signals then tend to become equal at the output of the compression circuits and the restored image elements thus tend to become achromatic. The phenomenon becomes even more visible as the colours become less saturated, i.e. flesh tint, blue sky, pastel shade, etc.

SUMMARY OF THE INVENTION

The object of the present invention is a device which does not suffer from the disadvantages described above, because it restores three colour signals whose value have been multiplied by the same coefficient, in order to retain the ratios existing between the values of the three colour signals prior to compression.

The present invention specifically relates to a device for reducing the amplitude range of three colour signals representing an image, wherein it comprises means for supplying at each instant a correction signal, whose value is a predetermined non-linear function of the value of the colour signal having the highest value at the considered instant, said function having a graph constituted by two straight line segments with different, predetermined slopes; and calculating means receiving the correction signal and three colour signals in order to supply three colour signals having reduced amplitude ranges, the value of each colour signal being calculated as a linear function of the value of the corresponding colour signal whose amplitude range is to be reduced and also as a function of the value of the correction signal.

BRIEF DESCRIPTION OF THE DRAWINGS

The invention is described in greater detail hereinafter relative to non-limiting embodiments and the drawings, in which.

DESCRIPTION OF THE PREFERRED EMBODIMENTS

Figure 1:
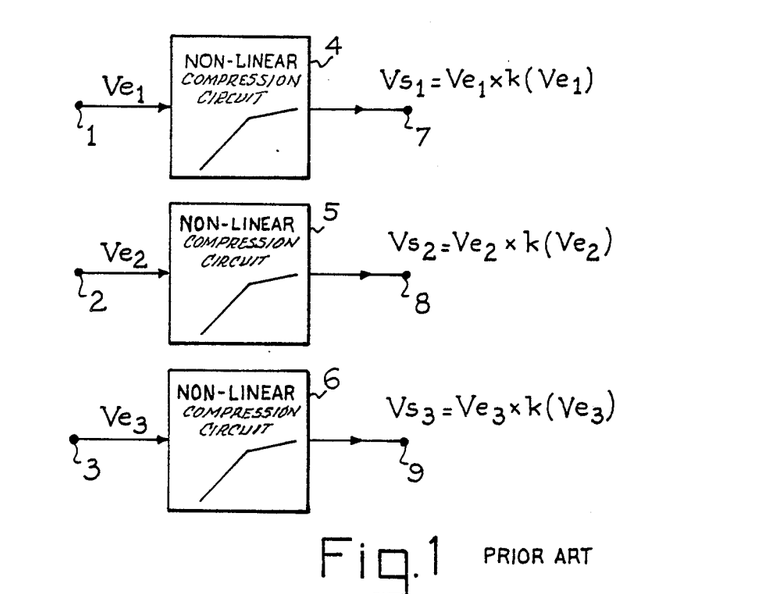
FIG. 1 is a block diagram of an embodiment of a known device.

The embodiment shown in FIG. 1 and corresponds to a prior art device, and comprises three identical, non-linear compression circuits 4 to 6, which receive three colour signals, respectively on three input terminals 1 to 3, and respectively restore three colour signals having reduced amplitude ranges on three output terminals 7 to 9. The three colour signals whose amplitude ranges are to be reduced have the respective instantaneous values $Ve_1$, $Ve_2$, and $Ve_3$. The three colour signals whose amplitude ranges have been reduced to have the respective instantaneous values $Vs_1$, $Vs_2$, and $Vs_3$. The values of the restored signals are related to the values of the signals applied to the input terminals by the relations:

$$Vs_1 = Ve_1 \times k(Ve_1)$$

$$Vs_2 = Ve_2 \times k(Ve_2)$$

$$Vs_3 = Ve_3 \times k(Ve_3)$$

The ratio k between the value of a signal at the input of each compression circuit and the value of the signal at the output of each compression circuit is dependent on the value of the signal at the input. K is equal to 1 when the value of the signal at the input is below a fixed threshold value, which is identical for the three ccs and is below 1 for values of the input signal exceeding the value of the threshold. With the values of the three input signals generally non-identical, the values of k at a given instant are generally different. When all the input signals have a value below the threshold value, the value of k is equal to 1 for all the signals, and the ratios between the values of the signals at the input are retained. Consequently the colours of the corresponding image elements are retained. However, when one or two input signals has a value exceeding the threshold, the values of k are no longer identical for the three signals, so that the ratios between the values of the output signals are not identical to the ratios between the values of the input signals. The colours of the corresponding image elements are thus faded.

Figure 2:
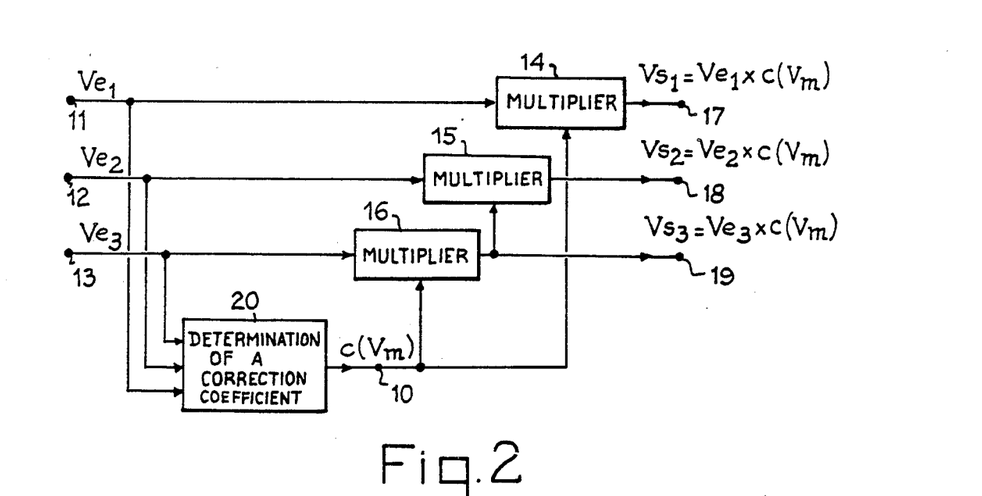
FIGS. 2, 4, 5 and 11 are block diagrams of of three embodiments of the device according to the invention.

FIG. 2 shows a block diagram of a first exemplary embodiment of the device according to the invention. This embodiment comprises three analog multipliers 14 to 16 and a device 20 for determining a correction coefficient c(Vm). Three colour signals, whose amplitude ranges are to be reduced, are respectively applied to the three input terminals 11 to 13 and have the respective instantaneous values $Ve_1$, $Ve_2$, $Ve_3$. They are respectively transmitted to first inputs of multipliers 14 to 16 and to three inputs of device 20. Device 20 supplies a signal of value c(Vm) to an output terminal 10, which is connected to second inputs of multipliers 14 to 16, which have outputs respectively connected to three output terminals 17 to 19 of the device according to the invention. These output terminals respectively supply three colour signals, whose amplitude ranges have been reduced and which are related to the original color signals by the relations:

$$Vs_1 = Ve_1 \times c(Vm)$$

$$Vs_2 = Ve_2 \times c(Vm)$$

$$Vs_3 = Ve_3 \times c(Vm)$$

Thus, the device performs the multiplication of each of the three colour signals by a same correction coefficient value c(Vm). This coefficient is a function of the value Vm, which is the highest value, at the considered time, from among the three values of the colour signals. When this value Vm is below a fixed threshold, the value c(Vm) is equal to 1 and when the value Vm exceeds the fixed threshold, the value c(Vm) is below 1, thereby compressing the original colour signals for obtaining a Since the values of the three colour signals are multiplied by the same value, their ratios are retained and the colours of the corresponding image elements will not be faded.

Figure 3:
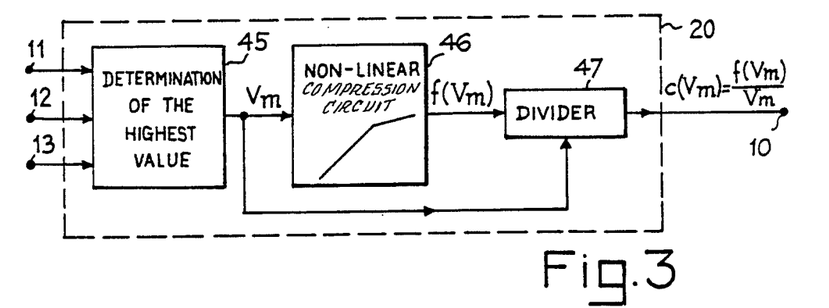
FIGS. 3, 6 and 9 are more detailed block diagrams of certain parts of these three embodiments.

FIG. 3 shows a more detailed block diagram of device 20 for determining a correction coefficient c(Vm). It comprises a device 45 for determining the highest value, a non-linear compression circuit 46 and an analog divider 47. The three inputs of device 20 are connected to three inputs of device 45 and the latter has an output connected to an input of quadripole 46 and to a first input of divider 47. A second input of divider 47 is connected to one output of quadripole 46 and one output of divider 47 forms the output of device 20 and is connected to output terminal 10.

The output of the device 45 for determining the highest value supplies a signal of value Vm to the input of compression circuit; 46. The latter performs either a unity gain transmission or a compression and restores a signal of value f(Vm). Divider 47 supplies a signal of value $c(Vm) = f(Vm)/Vm$ which makes it possible to control the compression operation of all three colour signals, as a function of the compression to be obtained on the colour signal which, at the considered time most needs to be compressed.

Device 45 can be formed by a combination of three diodes coupled by their cathodes. The three colour signals are respectively applied to the three anodes. The diode, which has the most positive anode is the only one which is conductive. The non-linear compression circuit 46 has a transfer function whose graph is constituted by two straight line segments, a first segment having a unitary slope and corresponding to the low and medium signal values and a second segment with a slope below 1 and corresponding to the high signal values. Compression circuit 46 and divider 47 are not described in greater detail, because their construction falls within the routine scope of the Expert.

Figure 4:
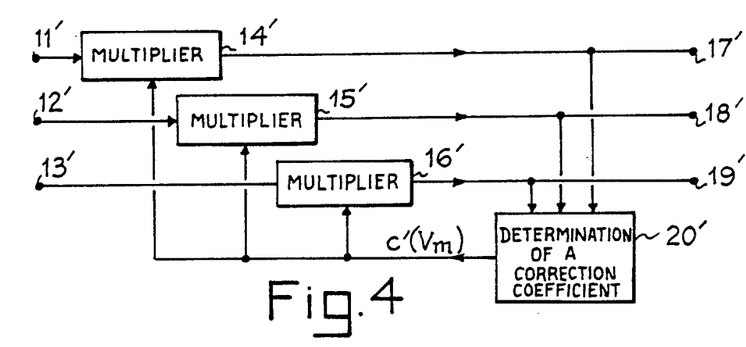

FIG. 4 shows a block diagram of a second embodiment of the device according to the invention. This embodiment has the same elements as the preceding embodiment, but the three inputs of the device 20' for determining a correction coefficient are connected to the output terminals 17' to 19' of the device according to the invention and not to the input terminals 11' to 13'. The determination of the colour signal having the highest instantaneous value is unchanged and the value c'(Vm) of the correction signal converges towards a value differing only slightly from c(Vm). Thus, the compression effect is very similar.

Figure 5:
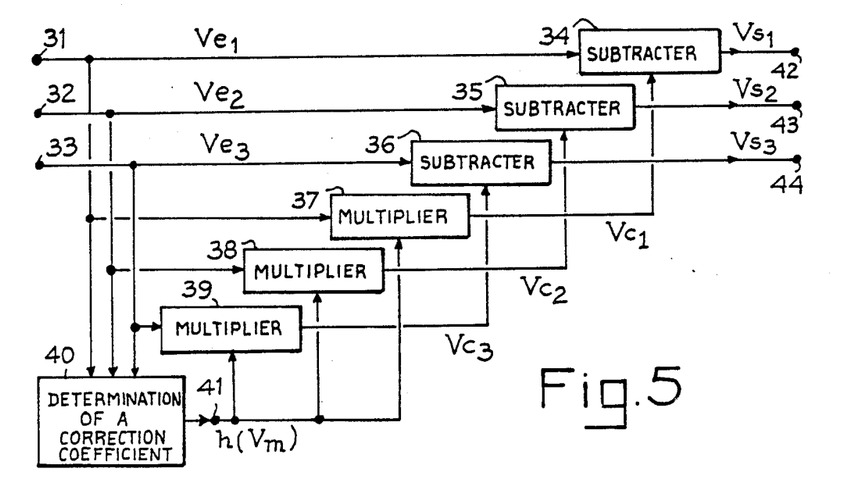

FIG. 5 shows a block diagram of a third embodiment of the device according to the invention. In this embodiment, the three colour signals are processed by subtracters and not by multipliers and the value of each of the restored colour signals is calculated by a linear function of the value of the considered colour signal and of the value h(Vm) of a correction signal. Naturally, these subtracters receive three differing correction signals which also differ from the correction signal f(Vm) generated by device 20 and 20' of the previous embodiments, but values $Vs_1$, $Vs_2$ and $Vs_3$ of the output signals are still related to the values of the signals applied to the input terminals by the relations:

$$Vs_1 = c(Vm) \cdot Ve_1$$

$$Vs_2 = c(Vm) \cdot Ve_2$$

$$Vs_3 = c(Vm) \cdot Ve_3$$

in order to retain the ratios existing between the input signals.

This third embodiment comprises three analog subtracters 34 to 36, three analog multipliers 37 to 39 and a device 40 for determining a correction coefficient. The subtracters 34 to 36 have first inputs respectively connected to three input terminals 31 to 33 of the device according to the invention, second inputs respectively connected to the outputs of multipliers 37 to 39 and outputs respectively connected to three output terminals 42 to 44 of the device according to the invention. Multipliers 37 to 39 have first inputs respectively connected to the three input terminals 31 to 33 and have second inputs connected to an output terminal 41 of device 40.

Device 40 has three inputs respectively connected to three input terminals 31 to 33. Device 40 generates a signal of value h(Vm), which is transmitted by its output terminal 41 to second inputs of multipliers 37 to 39. The latter then supply three correction signals having the respective values:

$$Vc_1 = Ve_1 \times h(Vm)$$

$$Vc_2 = Ve_2 \times h(Vm)$$

$$Vc_3 = Ve_3 \times h(Vm)$$

Thus, subtracters 34 to 36 supply colour signals having reduced amplitude ranges and respective values:

$$Vs_1 = Ve_1 - Ve_1 \times h(Vm)$$

$$Vs_2 = Ve_2 - Ve_2 \times h(i\ Vm)$$

$$Vs_3 = Ve_3 - Ve_3 \times h(Vm)$$

The value of each of the color signals is multiplied by the coefficient $1 - h(Vm)$, and thus the ratios between the values of the input signals are retained, even though the main operation performed on these signals is a subtraction and not a multiplication.

The values $Vc_1$, $Vc_2$ and $Vc_3$ of the correction signals are generally lower than the original values $Ve_1$, $Ve_2$ and $Ve_3$ of the colour signals. In particular, when there is no compression, the correction signals have a zero value. Therefore, when there is no compression the correction signals cannot add distortion to the colour signals. Moreover, the colour signals passing through subtracters 34 to 36 are less distorted than the colour signals passing through multipliers, like those described in the two previously described embodiments, because the analog subtracters are generally more linear than analog multipliers. Thus, this third embodiment has the advantage of transmitting colour signals with less distortion.

Figure 6:
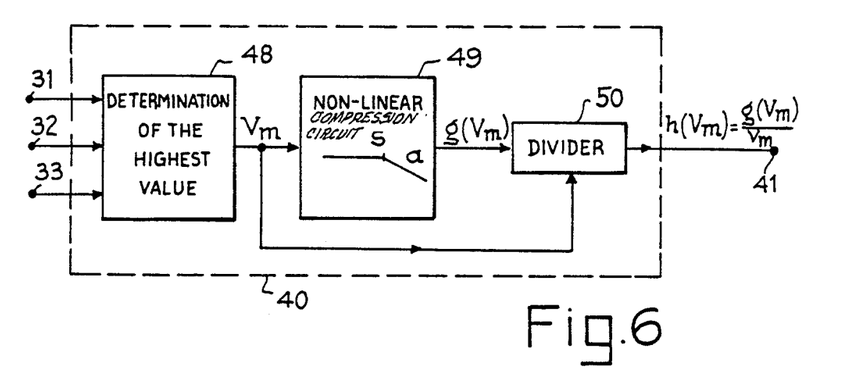

FIG. 6 shows a block diagram of an embodiment of the device 40 for determining a correction coefficient $h(Vm)$. Device 40 comprises a device 48 for determining the highest value, a non-linear compression circuit 49 and an analog divider 50. Device 48 has three inputs respectively connected to the three inputs of device 40 and an output connected to an input of compression circuit 49 and to a first input of divider 50. A second input of divider 50 is connected to an output of compression circuit 49. An output of divider 50 constitutes the output of device 40 and is connected to output terminal 41.

Device 48 selects the value $Vm$, which is the highest among the instantaneous values of the three input colour signals and transmits it to the non-linear compression circuit 49. The latter restores a value $g(Vm)$, which is a function of the value $Vm$ according to a non-linear law, whose graph has a first zero slope segment corresponding to low and medium values of $Vm$ and a second segment with a negative slope of value a corresponding to high values of $Vm$. The threshold value S separating the two segments and the slope a of the second segment can be regulated by the user of the device respectively on a range $S_0$, $S_2$ and on a range $a_0$, $a_2$. Divider 50 supplies a correction signal of value $h(Vm) = g(Vm)/Vm$.

When $Vm$ is below the threshold S, compression circuit 49 supplies a signal of value $g(Vm)=0$. Device 40 then supplies a signal of value $h(Vm)=0$.

When $Vm$ exceeds the threshold S, compression circuit 49 supplies a signal of value $g(Vm) \neq 0$. Device 40 then supplies a signal of value:

$$h(Vm) = \frac{a \cdot (Vm - S)}{Vm}.$$

Subtracter 34 or 35 or 36 corresponding to the colour signal with the highest value $Vm$ at the considered time, then supplies a signal of value $Vm - Vm \cdot h(Vm)$, which is equal to $Vm - g(Vm)$.

Figure 7:
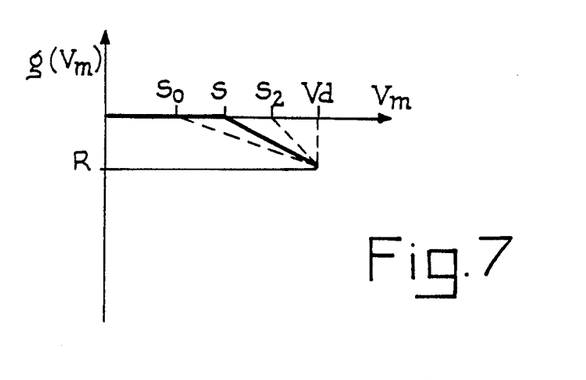
FIGS. 7, 8 and 10 are graphs illustrating the operation of one of these embodiments.

FIG. 7 shows the graph of the transfer function of compression circuit 49 in continuous line form for a threshold value S and a slope value a and in broken line form for threshold value $S_0$ with slope $a_0$ and for a threshold value $s_2$ with a slope value $a_2$. The threshold value and the associated slope value are chosen such that for a colour signal value equal to the maximum possible $Vd$, the value of the signal supplied by compression circuit 49 is equal to a value R, which is fixed and identical in all cases. This value R corresponds to the reduction of the amplitude range which is necessary and which is independent of the settings of a and S chosen by the user. The amplitude range reduction of value R is determined by the characteristics of the source of the colour signals and by the characteristics of the system receiving the signals following amplitude range reduction. However, the choice of the thresholds and the slope a is left to the user of the device according to the invention and is performed as a function of the visual result obtained.

Figure 8:
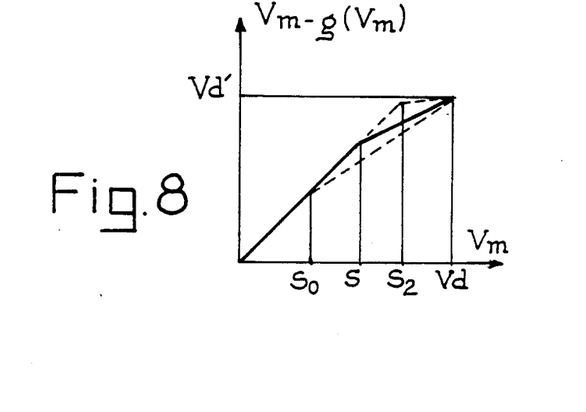

FIG. 8 is a graph of $Vm - g(Vm)$ as a function of $Vm$, i.e. it represents the transmission curve of the device according to the invention for the colour signal with the greatest amplitude at the considered time. The continuous line curve corresponds to a threshold value S and to the slope of value a for quadripole 49. The broken line curves corrrespond to a threshold value $S_0$ and a slope of value $a_0$ on the one hand and to a threshold value $S_2$ and a slope value $a_2$ on the other. In the latter case, the graph has a substantially zero slope segment in the range of high values close to the maximum value $Vd$. The value of the restored signal is then substantially equal to $Vd' = Vd - R$, which is determined by the characteristics of the transmission or recording systems located downstream of the device according to the invention. Thus, there is virtually a clipping of the three colour signals. By regulating the values S and a, the user can displace the graph throughout the area defined by the dots.

The realisation of a non-linear compression circuit 49, whose graph comprises a zero slope segment and a non-zero slope segment is easier than producing the non-linear compression circuit 46 of the preceding variants, particularly if it is wished to be able to regulate the value of the thresholds and the slope a. In order to permit an easy use of the device according to the invention, it is desirable for a single control to simultaneously regulate the threshold value and the slope value, while retaining the convergence of the graphs at the abscissa point $Vd$.

Figure 9:
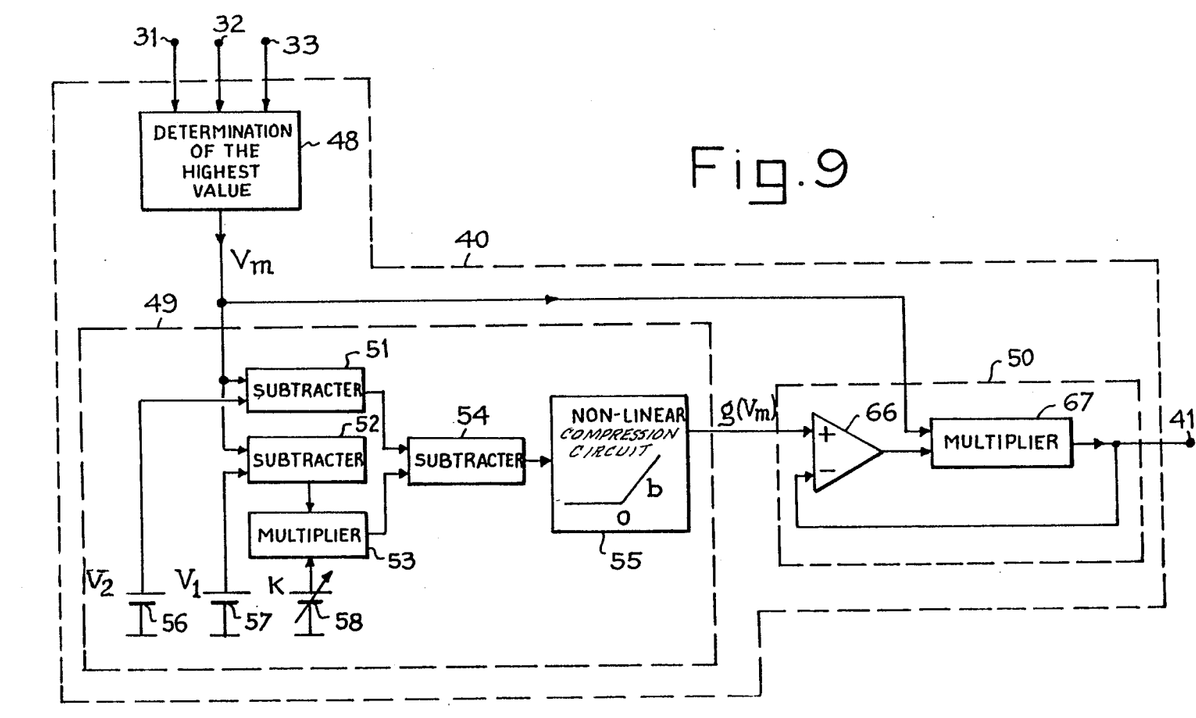

FIG. 9 shows a more detailed block diagram of the correction coefficient determination device 40 of FIG. 6. This embodiment is shown in a more detailed manner than in FIG. 6 and describes an embodiment which makes it possible to regulate threshold S and slope a by a single control. Moreover, FIG. 9 shows the block diagram of an embodiment of divider 50.

Device 40 comprises a device 48 for determining the highest value $Vm$ among the values of the colour signals, whose amplitude ranges are to be reduced, as well as an analog divider 50 and a non-linear compression circuit 49. The latter is constituted by three analog subtracters 51, 52 and 54, an analog multiplier 53, two generators 57, 56 of fixed voltages $V_1$ and $V_2$, a generator 58 of a regulatable voltage K and a non-linear compression circuit with a fixed characteristic 55.

The input of compression circuit 49 is connected to first, positive inputs of subtracters 51, 52. A second, negative input of subtracter 51 is connected to the generator 56 of voltage $V_2$. A second, negative input of subtracter 52 is connected to generator 57 of voltage $V_1$. An ouput of subtracter 51 is connected to a first, positive input of subtracter 54. An output of subtracter 52 is connected to a first input of multiplier 53. A second input of multiplier 53 is connected to the generator 58 of voltage K and an output of multiplier 53 is connected to a second, negative input of subtracter 54. An output of subtracter 54 is connected to an input of compression circuit 55 and an output of the latter forms the output of compression circuit 49 and is connected to an input of divider 50.

The transfer function of compression circuit 55 has a first zero slope segment for the negative values of its input signal and a second positive, fixed slope segment b for positive values of its input signal.

Divider 50 is constituted by an operational amplifier 66 and an analog multiplier 67. The second input of divider 50 is connected to a first input of multiplier 67. A second input of multiplier 67 is connected to an output of operational amplifier 66 and an output of multiplier 67 is connected on the one hand to an input with inversion of amplifier 66 and on the other hand to the output terminal 41 of the correction coefficient determination device 40. An input without inversion of the operational amplifier 66 constitutes the first input of divider 50, which is connected to the output of compression circuit 49.

In this embodiment, threshold S and slope a are regulatable integrally by acting on generator 58 of variable voltage K. The output of subtracter 54 supplies a signal of value $V_m - V_2 - K \cdot (V_m - V_1)$. When this value is negative, compression circuit 55 supplies a zero value signal $g(V_m)$. When it is positive, compression circuit 55 supplies a value:

$$g(V_m) = b \cdot (V_m - V_2 - K \cdot (V_m - V_1))$$

$$g(V_m) = b \cdot (V_m \cdot (1 - K) - V_2 + K \cdot V_1))$$

The graph of the transfer function $g(V_m)$ of compression circuit 49 is thus constituted by a first segment, whose ordinate is zero for values $V_m$ such that: $V_m - K \cdot (V_m - V_1)$ is equal to or below zero, i.e. for values $V_m$ equal to or below a threshold value:

$$S = \frac{V_2 - K \cdot V_1}{1 - K}$$

The graph of the transfer function $g(V_m)$ has a second non-zero slope segment equal to:

$$a = b \cdot (1 - K).$$

Therefore the thus constituted compression circuit 49 has the tranfer function $g(V_m)$ shown in FIG. 7. By varying K over a range $K_0$, $K_2$ it is possible to simultaneously modify the value of S over a range $S_0$, $S_2$ and the value of a over a range $a_0$, $a_2$.

The graph of the function $V_m - g(V_m)$ thus has a first segment of unitary slope for values $V_m$ below S and a second segment of slope equal to $1 - b \cdot (1 - K)$. This segment belongs to a line, whose equation is:

$$V_m - g(V_m) = V_m - b \cdot (V_m \cdot (1 - K) - V_2 + K \cdot V_1))$$

$$V_m - g(V_m) = V_m \cdot (1 - b + b \cdot K) + b \cdot V_2 - b \cdot K \cdot V_1$$

It is easy to prove that for $V_m$ equal to $V_1$, the value $V_m - g(V_m)$ is equal to a value $V_3$ independent of K, because the terms in K eliminate one another:

$$V_3 = V_1 \cdot (1 - b) + b \cdot V_2$$

As the value $V_3 = V_1 - g(V_1)$ is independent of K, it corresponds to a fixed point of the graph of $V_m - g(V_m)$. This fixed point $(V_1, V_2)$ of the graph corresponds to the point of coordinates $V_d$, $V_{d'}$ by which it is wished to pass the graph. Knowing the values $V_d$ and $V_{d'}$, which are fixed by the characteristics of the television system, it is easy to know $V_1$ and $V_3$ $$V_1 = V_d$$

$$V_3 = V_{d'}$$

The value $V_2$ is then deduced from the value of $V_3$ after fixing the value b of the slope of the non-linear compression circuit 55:

$$V_3 = V_1 \cdot (1 - b) + b \cdot V_2 \text{ thus } V_2 = \frac{V_3 - V_1 \cdot (1 - b)}{b}$$

$$V_2 = \frac{V_d - V_d \cdot (1 - b)}{b}$$

The slope of b is chosen between zero and 1, as a function of the maximum efficiency which it is wished to permit for the compression. Value $1 - b$ fixes the slope of the upper graph in the range of the high values. For example, if b is equal to unity, $V_2$ is equal to $V_3$ and the segment of the graph connecting the ordinate points $S_2$ and $V_d$ is a zero slope segment.

Figure 10:
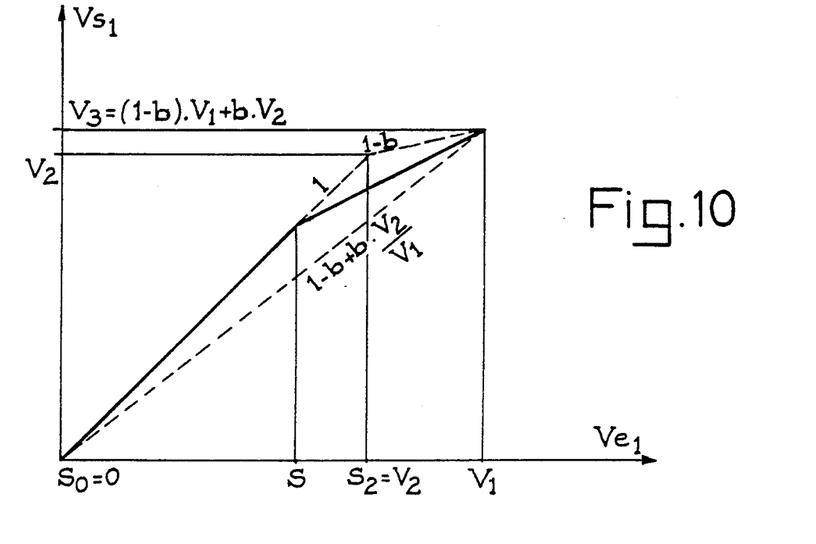

FIG. 10 shows the same graph as FIG. 8, in the case where the colour signal with the highest value is that having the value $V_1$ and by revealing the values of parameters $V_1$, $V_2$ and b for showing the effect of each of these parameters. The continuous line curve represents the transfer function $V_{s1}$ ($V_{e1}$) of the device according to the invention for a fixed value of K between 0 and $V_2/V_1$.

The upper curve in broken lines corresponds to the transfer function obtained for $K = 0$ and the lower curve in broken lines corresponds to the transfer function obtained for $K = V_2/V_1$. It should be noted that the lower threshold value $S_0$ is zero in this case in other words the transfer function no longer has an elbow. The slope is $$1 - b + b \cdot \frac{V_2}{V_1}.$$

By regulating the value of K, it is possible to displace the graph of the transfer function within the zone defined by the two broken line curves.

For example, if the amplitude ranges of the input signals are equal to 8dB and must be reduced at the output to 2dB and if it is wished that the maximum compression compresses a range of 7.2dB to a range of 1dB, a value $V_2$ is chosen corresponding to 0.8dB below the value $V_3$. If V is the nominal value of each of the colour signals, the value $V_1$ which is the maximum value of the signals at the input is equal to 2.5 V. Value $V_3$, which is the maximum admissible value at the output to 1.25 V. The value $V_2$, which determines the threshold C on the basis of which a compression is always realised, is equal to 1.1 V and the relation:

$$V_3 = (1 - b) \cdot V_1 + b \cdot V_2 = (1 - b) \cdot 2.5 \cdot V + b \cdot 1.1 \quad V = 1.25$$
$$V$$

makes it possible to determine the value of b:

$$b = \frac{1.5}{1.4} = 0.89$$

By varying K between zero and $V_2/V_1=0.44$, it is possible to regulate the compression obtained between the maximum compression and the minimum compression corresponding to the lower broken line graph curve.

The realisation of an analog compression circuit 55 not transmitting a signal when it has a negative value and transmitting it with a gain of 0.89 when it has a positive value forms part of the prior art and leads to no particular problem.

Figure 11:
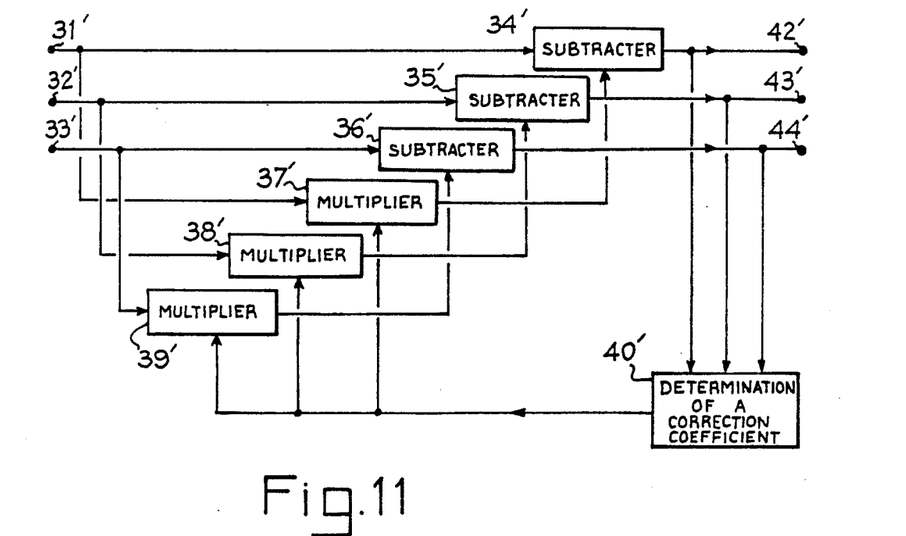

FIG. 11 shows the block diagram of a forth embodiment of the device according to the invention and having the same elements as the third embodiment, but in which the inputs of a correction coefficient determination device 40' are respectively connected to the three outputs of the device according to the invention instead of being connected to three inputs thereof. The signal with the highest value at the input is also the signal having the highest value at the output, but its value is modified by the amplitude range reduction treatment. The amplitude range reduction process converges and finally the reduction obtained is identical to that obtained with the preceding embodiment.

The invention is not limited to the embodiments described herein before and numerous variants can be made thereto and it is in particular possible to process the three colour signals by means of entirely digital devices. The invention is applicable to the processing of colour television signals, particularly in television production studios.

What is claimed is:

1. A device for reducing the amplitude range of a plurality of input signals representing an image, comprising:
    means for determining at each instant a correction signal whose instantaneous value is a predetermined non-linear function of the present input signal having the highest value at that instant; and
    means for applying the correction signal to each of the input signals so as to generate a second, like-numbered plurality of output signals, the output signals having reduced amplitude ranges relative to the input signals, but the ratios among the respective output signals equalling the ratios among corresponding input signals.

2. A device as in claim 1, wherein the predetermined non-linear function has a graph comprising two straight-line segments having different slopes.

3. A device as in claim 2, wherein the slope of the first straight-line segment is unity and the slope of the second straight-line segment is less than unity.

4. A device as in claim 3, wherein the plurality of input signals comprises three color signals.

5. A device as in claim 1, wherein the correction signal determining means comprises:
    means for determining the highest instantaneous signal value among all of the signals in the plurality of input signals;
    means for compressing the highest instantaneous signal value into a compressed signal;
    means for dividing the compressed signal by the highest instantaneous signal, thereby determining the correction signal.

6. A device as in claim 5, wherein the compressing means has a graph comprising two straight-line segments having different slopes, the slope of the first straight-line segment being unity and the slope of the second straight-line segment being less than unity.

7. A device as in claim 5, wherein the compressing means has a graph comprising two straight-line segments having different slopes, the slope of the first straight-line segment being zero and the slope of the second straight-line segment being negative.

8. A device as in claim 7, wherein the applying means comprises:
    a plurality of multiplying means, one input of each being provided with one of the input signals and the other input being provided with the correction signal; and
    a plurality of subtracting means, the positive input of each being provided with one of the input signals and the negative input being provided with the output of the multiplying means corresponding to that input signal, so that the outputs of the plurality of subtracting means provide the plurality of reduced amplitude range signals.

9. A device as in claim 5, wherein the compressing means comprises:
    a first fixed voltage source, V1;
    a second fixed voltage source, V2;
    a first subtracter, having its positive input provided with said highest instantaneous signal and its negative input provided with the output of the first fixed voltage source;
    a second subtracter, having its positive input provided with said highest instantaneous signal and its negative input provided with the output of the second fixed voltage source;
    a variable voltage source K;
    a compression multiplier, having one input provided with the output of the variable voltage source and the other input provided with the output of the first subtracter;
    a third subtracter, having its positive input provided with the output of the second subtracter and its negative input provided with the output of the compression multiplier;
    a nonlinear circuit having a graph comprising two straight-line segments having different slopes, the slope of the first straight-line segment being zero and the slope of the second straight-line segment being greater than zero.

10. A device as in claim 9, wherein the first fixed voltage source V1 is preset to the maximum possible input voltage which an input signal may assume.

11. A device as in claim 10, wherein the second fixed voltage source V2 is preset to the value of the maximum of the input signals above which compression is always performed.

12. A device as in claim 11, wherein the variable voltage source K may be varied between zero and V2/V1, such that when K is decreased, the onset of compression occurs at a relatively higher voltage, and such that when K is decreased, the compression of the signals is more pronounced once compression is performed.

13. A device as in claim 12, wherein regardless of the value to which the variable voltage source K is set, the maximum possible input voltage appearing at the inputs of the device is compressed to a value V3 equalling the maximum permissible output voltage of the device.

14. A device as in claim 13, wherein the slope of the second straight-line segment of the graph of the non-linear circuit equals b, where:

$$b = \frac{V1 - V3}{V1 - V2}$$

15. A device as in claim 1, wherein the applying means comprises a plurality of multiplying means, the correction signal being equally applied to one input of each of the multiplying means and the other input of each of the multiplying means being connected to one of the input signals.

16. A device as in claim 15, wherein the determining means has a plurality of inputs each of which is connected to one of the input signals.

17. A device as in claim 15, wherein the determining means has a plurality of inputs each of which is connected to one of the output signals.

18. A device as in claim 1, wherein the determining means has a plurality of inputs each of which is connected to one of the input signals.

19. A device as in claim 1, wherein the determining means has a plurality of inputs each of which is connected to one of the output signals.

20. A device as in claim 1, wherein the applying means comprises:
    a plurality of multiplying means, one input of each being provided with one of the input signals and the other input being provided with the correction signal; and
    a plurality of subtracting means, the positive input of each being provided with one of the input signals and the negative input being provided with the output of the multiplying means corresponding to that input signal, so that the outputs of the plurality of subtracting means provide the plurality of reduced amplitude range signals.

21. A device as in claim 20, wherein the determining means has a plurality of inputs each of which is connected to one of the input signals.

22. A device as in claim 20, wherein the determining means has a plurality of inputs each of which is connected to one of the output signals.

23. A method for reducing the amplitude range of a plurality of input signals representing an image, comprising:
    determining at each instant a correction signal whose instantaneous value is a predetermined non-linear function of the input signal having the highest instantaneous value;
    applying the correction signal to each of the input signals so as to generate a second, like-numbered plurality of output signals, the output signals having reduced amplitude ranges relative to the input signals, but the ratios among the respective output signals equalling the ratios among corresponding input signals.

24. A method as in claim 23, wherein the predetermined non-linear function has a graph comprising two straight-line segments having different slopes.

25. A method as in claim 24, wherein the slope of the first straight-line segment is unity and the slope of the second straight-line segment is less than unity.

26. A method as in claim 25, wherein the plurality of input signals comprises three colour signals.

27. A method as in claim 23, wherein the correction signal is determined by:
    determining the highest instantaneous signal value among all of the signals in the plurality of input signals;
    compressing the highest instantaneous signal value into a compressed signal;
    dividing the compressed signal by the highest instantaneous signal, thereby determining the correction signal.

28. A method as in claim 27, wherein the compression transfer function has a graph comprising two straight-line segments having different slopes, the slope of the first straight-line segment being unity and the slope of the second straight-line segment being less than unity.

29. A method as in claim 28, wherein the compression comprises:
    providing a first fixed voltage, V1;
    providing a second fixed voltage, V2;
    subtracting the first fixed voltage V1 from said highest instantaneous signal to derive a first derivative signal;
    subtracting the second fixed voltage V2 from said highest instantaneous signal to derive a second derivative signal;
    providing a variable voltage K;
    multiplying the variable voltage K times the first intermediate signal to derive a third intermediate signal;
    subtracting the third intermediate signal to derive a fourth intermediate signal;
    compressing the fourth intermediate signal by non-linear circuit means having a graph comprising two straight-line segments having different slopes, the slope of the first straight-line segment being zero and the slope of the second straight-line segment being greater than zero.

30. A method as in claim 29, wherein the first fixed voltage V1 is preset to the maximum possible input voltage which an input signal may assume.

31. A method as in claim 30, wherein the second fixed voltage V2 is preset to the value of the maximum of the input signals above which compression is always performed.

32. A method as in claim 31, wherein the variable voltage K may be varied between zero and V2/V1, such that when K is decreased, the onset of compression occurs at a relatively higher voltage, and such that when K is decreased, the compression of the signals is more pronounced once compression is performed.

33. A method as in claim 32, wherein regardless of the value to which the variable voltage K is set, the maximum possible input voltage appearing at the inputs of the device is compressed to a value V3 equalling the maximum permissible output voltage of the device.

34. A method as in claim 33, wherein the slope of the second straight-line segment of the graph of the non-linear circuit means equals b, where:

$$b = \frac{V1 - V3}{V1 - V2}$$

35. A method as in claim 27, wherein the compression transfer function has a graph comprising two straight-line segments having different slopes, the slope of the first straight-line segment being zero and the slope of the second straight-line segment being negative.

36. A method as in claim 35, wherein the correction signal is applied to the input signals by:
    multiplying each of the input signals by the correction signal to generate a plurality of intermediate signals; and subtracting each intermediate signal from the corresponding input signal, thereby deriving a plurality of reduced amplitude range signals.

37. A method as in claim 23, wherein the correction signal is separately multiplied times each of the respective input signals, thereby generating reduced amplitude range output signals.

38. A device as in claim 37, wherein the correction signal is determined from sampling the plurality of input signals.

39. A device as in claim 37, wherein the correction signal is determined from sampling the plurality of output signals.

40. A method as in claim 23, wherein the correction signal is applied to the input signals by:
   multiplying each of the input signals by the correction signal to generate a plurality of intermediate signals; and
   subtracting each intermediate signal from the corresponding input signal, thereby deriving a plurality of reduced amplitude range signals.

41. A method as in claim 40, wherein the correction signal is determined from sampling the plurality of input signals.

42. A method as in claim 40, wherein the correction signal is determined from sampling the plurality of output signals.

* * * * *